(12) United States Patent
Dewhurst

(10) Patent No.: US 10,168,880 B2
(45) Date of Patent: Jan. 1, 2019

(54) SYSTEM, METHOD AND COMPUTER-ACCESSIBLE MEDIUM FOR MANIPULATING A PLURALITY OF COMPONENTS USING A SINGLE GESTURE OR MOTION

(71) Applicant: Jerome Dewhurst, London (GB)

(72) Inventor: Jerome Dewhurst, London (GB)

(73) Assignee: Jerome Dewhurst, Los Angeles, CA (US)

( * ) Notice: Subject to any disclaimer, the term of this patent is extended or adjusted under 35 U.S.C. 154(b) by 467 days.

(21) Appl. No.: 14/028,736

(22) Filed: Sep. 17, 2013

(65) Prior Publication Data

US 2014/0181671 A1   Jun. 26, 2014

Related U.S. Application Data

(60) Provisional application No. 61/710,339, filed on Oct. 5, 2012.

(51) Int. Cl.
| | | |
|---|---|---|
| *G06F 3/048* | (2013.01) | |
| *G06F 3/0484* | (2013.01) | |
| *G06F 3/01* | (2006.01) | |
| *G06F 3/0488* | (2013.01) | |

(52) U.S. Cl.
CPC .......... *G06F 3/04847* (2013.01); *G06F 3/017* (2013.01); *G06F 3/04883* (2013.01)

(58) Field of Classification Search
CPC ..... G06F 3/0484; G06F 3/017; G06F 3/04883
USPC ........................................................ 715/763
See application file for complete search history.

(56) References Cited

U.S. PATENT DOCUMENTS

| | | | | |
|---|---|---|---|---|
| 8,624,836 | B1* | 1/2014 | Miller et al. .................. | 345/157 |
| 2002/0063801 | A1* | 5/2002 | Richardson .................. | 348/589 |
| 2014/0173519 | A1* | 6/2014 | Sassi ............................ | 715/833 |

* cited by examiner

*Primary Examiner* — Jennifer N To
*Assistant Examiner* — Ashley M Fortino

(57) ABSTRACT

A system, method and computer-accessible medium for modifying a parameter which can receive a single input associated with at least two different points in space, determine a modification factor based on the single input, and modify the parameter(s) having at least two components based on the modification factor. The modification factor can be determined by an angle created by a line or a vector between a start point and an end point and either the x-axis or the y-axis. The input can be generated by a user making a gesture on a screen using a finger, or by a mouse, stylus, track pad, or other motion sensor. The parameter can be a Red/Green/Blue parameter or a sound equalizer.

18 Claims, 5 Drawing Sheets

SYSTEM, METHOD AND COMPUTER-ACCESSIBLE MEDIUM FOR MANIPULATING A PLURALITY OF COMPONENTS USING A SINGLE GESTURE OR MOTION

CROSS-REFERENCE TO RELATED APPLICATION(S)

This application relates to and claims priority from U.S. Patent Application Ser. No. 61/710,339, filed on Oct. 5, 2012, the entire disclosure of which is incorporated herein by reference.

FIELD OF THE DISCLOSURE

The present disclosure relates generally to exemplary systems, methods and computer-accessible medium for controlling at least one parameter having multiple components, and more specifically, to exemplary systems, methods and computer-accessible medium for manipulating such at least one parameter using, for example, a single gesture or motion.

BACKGROUND INFORMATION

Many visual media editing applications contain graphical user interfaces for changing parameters such as Red/Green/Blue ("RGB") color parameters, sound parameters etc. The parameters are passed to the application's processing procedure(s) where they are used to modify visual media, digital audio, or the like. For example, the "Levels" command in Adobe Photoshop displays a user interface with sliders that can represent individual Red, Green and Blue parameters, as well as global RGB parameters which can be used to change the highlights, mid-tones and shadows in an image. In order to manipulate the RGB parameter, a user, through a graphical user interface, can change a color parameter by moving or manipulating multiple graphical elements, such as sliders. This can be a cumbersome process as the user has to separately manipulate each parameter to gain the desired effect; often needing repeated manipulations of all of the parameters until the desired effect is reached.

Thus, it may be beneficial to provide exemplary systems, methods and computer-accessible medium that can manipulate a parameter having multiple components using a single gesture, and which can overcome at least some of the deficiencies described herein above.

SUMMARY OF EXEMPLARY EMBODIMENTS

Accordingly, it may be beneficial, using exemplary embodiments of the present disclosure, to change at least one color parameter using a single input, as opposed to color sliders or a color wheel, which can be advantageous by taking up little to no screen space, such that it can facilitate the user to be more engaged with the media they are editing.

These and other objects of the exemplary embodiments of the present disclosure can be achieved by provision of exemplary systems, methods and computer-accessible medium which can receive, for example, a single input, determine a modification factor based on the single input, and modify a parameter having at least two components based on the modification factor. The exemplary modification factor can be determined based on a line or vector created between a start point and an end point. The vector can be visually represented as a line. A color or an intensity of the line or vector can be changed based on the parameter being modified. The modification factor can be determined based on an angle formed by the line or the vector from a start point to an end point and one of an x-axis or a y-axis.

In some exemplary embodiments of the present disclosure, the input can be generated by a user making a gesture on a screen using a finger, or by a mouse, stylus, a track pad, a motion sensor that can track human movements or gestures, and/or other methods for moving a cursor to control a computer. The parameter can be a Red/Green/Blue color parameter or a sound equalizer parameter, and the parameter can be input into an application. The initial value of the parameter can be 0 or a number other than 0.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying figures showing illustrative embodiments of the present disclosure, in which.

Figure 1:
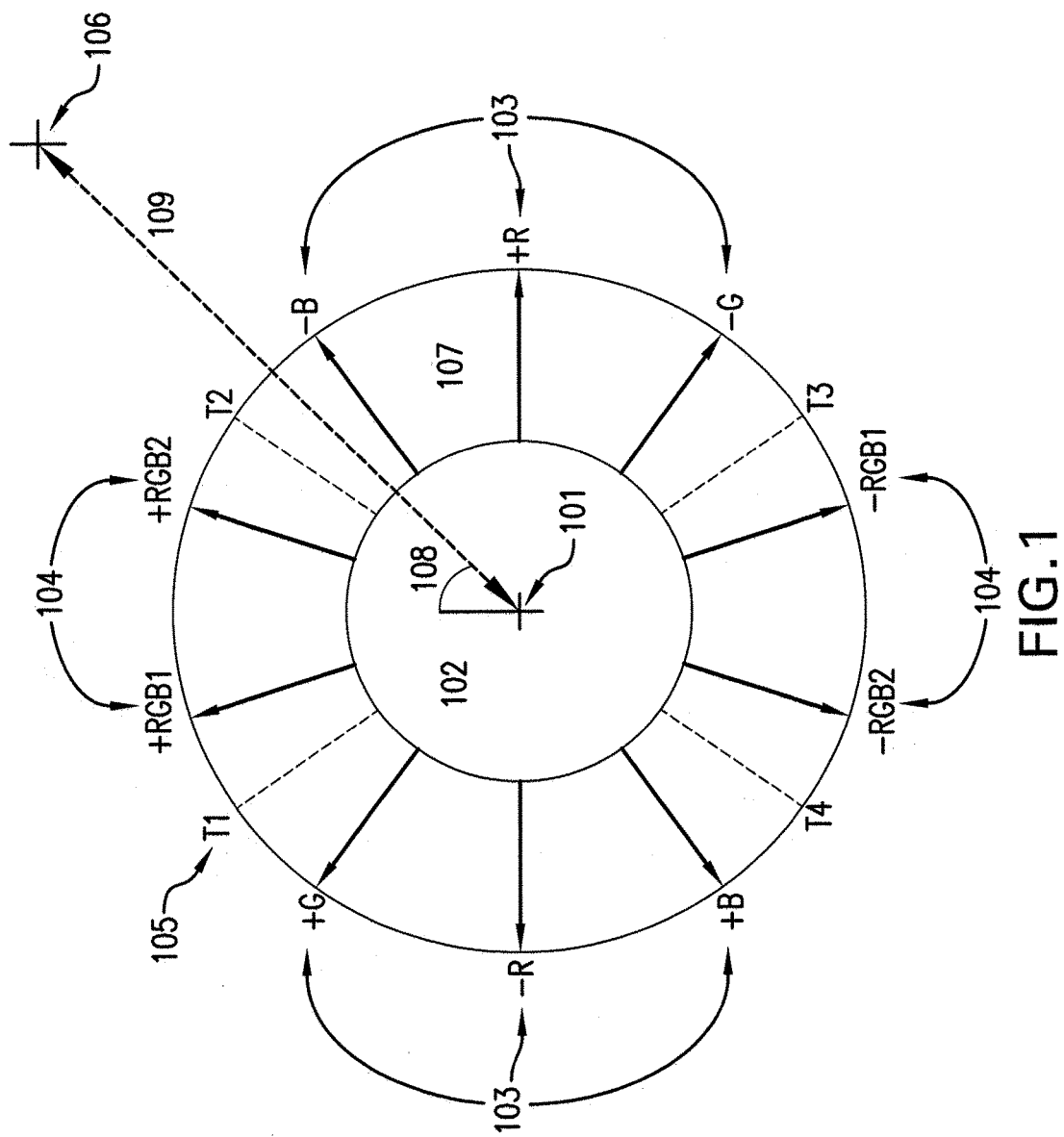
FIG. 1 is an exemplary display of an exemplary user interface according to an exemplary embodiment of the present disclosure.

Throughout the drawings, the same reference numerals and characters, unless otherwise stated, are used to denote like features, elements, components, or portions of the illustrated embodiments. Moreover, while the present disclosure will now be described in detail with reference to the figures, it is done so in connection with the illustrative embodiments and is not limited by the particular embodiments illustrated in the figures or in the appended claims.

DETAILED DESCRIPTION OF EXEMPLARY EMBODIMENTS

The exemplary embodiments of the present disclosure may be further understood with reference to the following description and the related appended drawings. The exemplary embodiments of the present disclosure relate to exemplary systems, methods and computer-accessible medium for manipulating one or more discrete components using a single gesture or motion. For example, the exemplary systems, methods and computer-accessible medium, according to an exemplary embodiment of the present disclosure, can manipulate at least one RGB color parameter using such single gesture or motion. The exemplary embodiments are described with reference to the RGB color parameter(s), although those having ordinary skill in the art will understand that the exemplary embodiments of the present disclosure can be implemented on any parameter having multiple components.

An exemplary start point of the exemplary systems, methods and computer-accessible medium can be defined by the position that the gesture begins (e.g., the location on a screen the user places their finger). For example, the user interface can be centered on the start point, and can include multiple elements including: (i) a color indicator, (ii) color hue and brightness angle indicators, and/or (iii) a line connecting the start point with the end point, although not limited thereto. The connecting line can be dynamically colored using the selected color hue or other parameter, or the connecting line can be a static color (e.g., black, blue etc.). The interface can optionally only include a single start point, and as the user drags their finger or a pointer (e.g., a mouse pointer), a line connecting their finger or a pointer to the start point can be created. Additionally, the interface can optionally include a single start point, and no line can be created as the user drags their finger or pointer.

The exemplary systems, methods and computer-accessible medium, according to an exemplary embodiment of the present disclosure, can determine at least one RGB parameter, or other parameter(s), based on the relative position of the start point and the end point. The RGB component(s) to be changed can be a function of an angle formed by a line or vector connecting the start point with the end point and a reference line of an axis (e.g., the x-axis). The magnitude of the parameter to be changed can be determined as a function of the distance from the start point to the end point. As the gesture is projected around the start point, the computed/determined RGB parameter can smoothly change in accordance with the angles assigned to the components. Different angles can be associated with different components such that a gesture in one direction (e.g., in the X+, Y+ quadrant or sectors divided up by the exemplary system, method and computer-accessible medium) can be different than gestures in another direction (e.g., X−, Y− quadrant). The computed/determined RGB component(s) can be input into a visual media editing application's processing procedure such that the media can be manipulated accordingly. In this manner, the exemplary systems, methods and computer-accessible medium, according to an exemplary embodiment of the present disclosure, can be used in conjunction with any visual media editing application, and the visual media editing application does not need to be specifically programmed to operate with the exemplary systems, methods and computer-accessible medium.

For example, a photo editing application executing on a tablet computer can have a function that can facilitate the user to tint an image to a certain color. After selecting the relevant "tint" tool from the application, the user only has to touch the image and drag around the start point to interactively see the image change color or brightness. As shown in FIG. 1, the user can drag a display or portion thereof, for example, to the right (e.g., from point 101 to point 106) to see the image become warmer, since the −B component can introduce the color yellow, the +R component can introduce the color red, and the −G component can introduce the color magenta. If the user drags the display or portion thereof, for example, to the left, the image can become cooler, with hues representing +G (the color green), −R (the color cyan), and +B (the color blue). If the user drags the display or portion thereof, for example, up or down, the color tint can be brightened or darkened. The further the user drags from the start point, the more saturated the selected color can become, or the selected brightness increase/decrease can become greater.

Since the effect can be additive, the user can drag the display or portion thereof, for example, to the right to warm the image and then perform a second gesture dragging up to brighten the effect. This can be performed by first dragging to the right and then dragging up without the user removing their finger from the display, or the user can drag their finger to the right, remove their finger from the display, and then place their finger back on the display and drag their finger up. As the user drags their finger around the start point, the color indicator at the start point can inform the user which color is being selected, and the color and brightness angle indicators can inform the user which way they need to move the gesture in order to select a certain hue, or brighten or darken the current color. The line can serve as a visual cue to inform the user how far, and in which direction, they have moved from the start point.

In addition, although color tint has been used as at least one exemplary parameter that can be manipulated, the exemplary systems, methods and computer-accessible medium can be used on any user interface that utilizes one or more RGB parameters as an input to a visual media processing procedure. Other exemplary parameters can include lift, gamma and gain RGB parameters and/or to selectively adjust the highlights, mid-tones and shadows in a digital video sequence, although not limited thereto.

Lift, gamma and gain parameters can have three components, and can be applied to the value of pixels in an RGB color space, for example, as:

$$f(\text{out}) = \text{gain}^* (\text{in} + \text{lift}^* (1 - \text{in}))^{\left(\frac{1}{\text{gamma}}\right)}$$

where out can represent the computed code value of each pixel's RGB component, in can represent the code value of a pixel in the visual media before any processing is applied, and lift, gamma and gain can represent three parameters that are used to manipulate the shadows, mid-tones and highlights in the visual media. The nominal values of lift can be approximately 0.0, 0.0, 0.0, and the nominal values of gamma and gain can be approximately 1.0, 1.0, 1.0.

Exemplary Input Detector and Gesture

When a user interaction begins or ends, an input detector can be flagged. For example, the user interaction can begin when the user touches the display, and the user interaction can end when the user stops touching the display (e.g., the user removes their finger from the display). The user interaction can also begin when an input device, such as a mouse, stylus or track pad is selected, and the user interaction can end when the input device is deselected. The "gesture" can refer to the cursor movement, or the touch movement, which can be tracked while the user input is active. Alternatively, the gesture can be tracked by an imaging apparatus (e.g., a camera) such that the user can move a body part, which is tracked by the camera. The input of the gesture captured by the camera can be converted into an input into the exemplary system, method and computer-accessible medium.

Figure 4A:
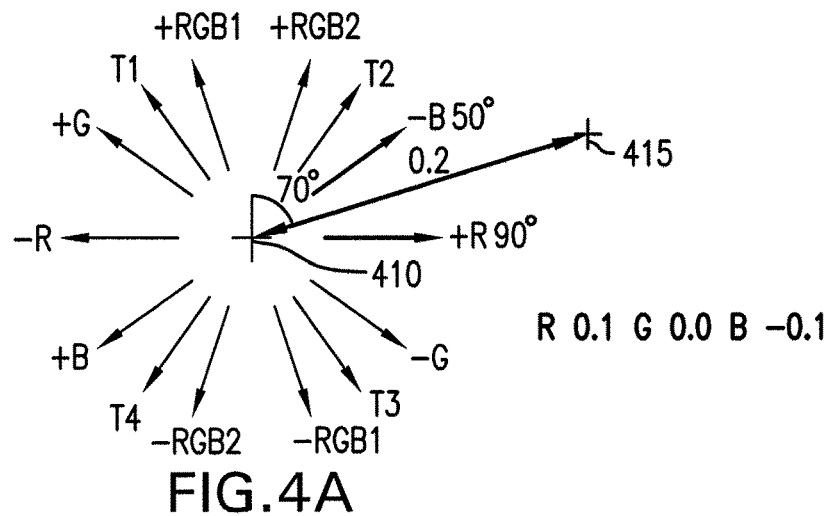
FIGS. 4A-4C are exemplary displays of exemplary manipulations of exemplary RGB parameters according to exemplary embodiments of the present disclosure.
Figure 4B:
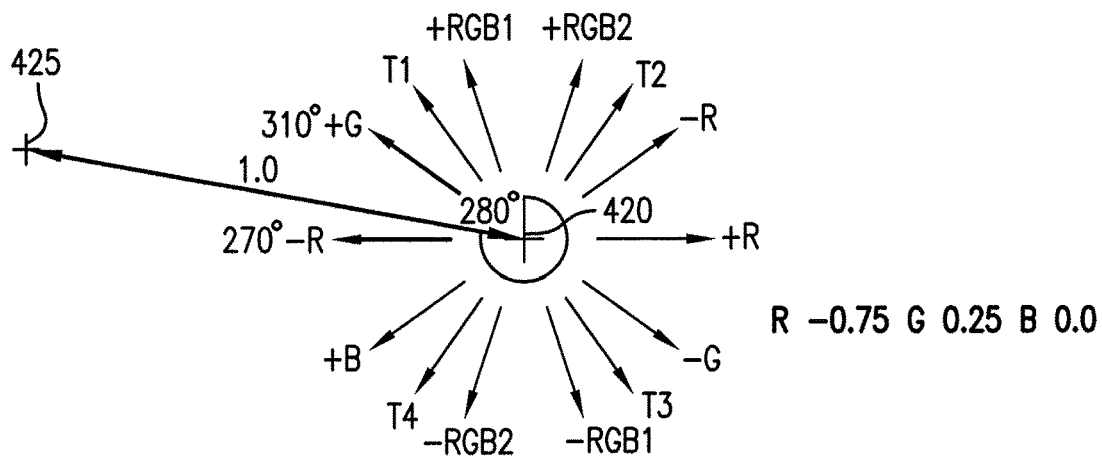
Figure 4C:
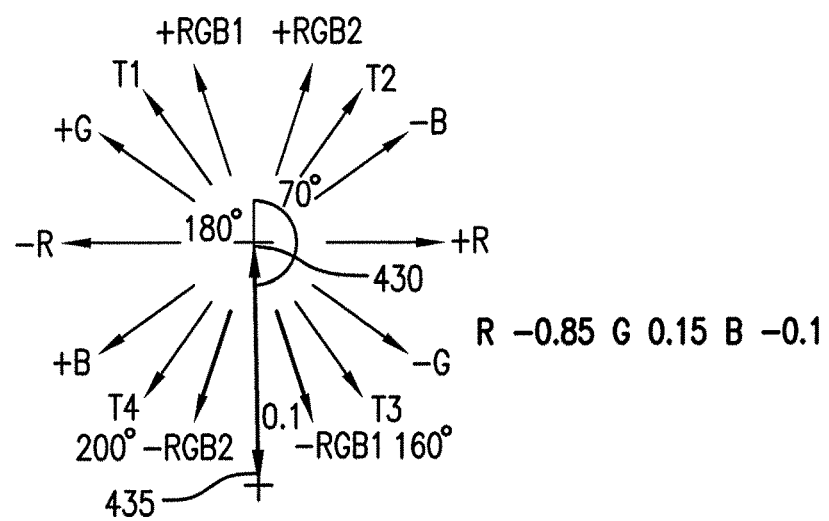

FIGS. 4A-4C are exemplary displays of exemplary manipulations of RGB parameters according to an exemplary embodiment of the present disclosure. The RGB parameter(s) returned by the exemplary systems, methods and computer-accessible medium, according to an exemplary embodiment of the present disclosure, can be used in various types of visual processing procedures. The nominal value of the parameter can be approximately 0, 0, 0, and the value can increase or decrease depending on the user's gesture. For example, as shown in FIG. 4A, when a value of 50° is assigned to the yellow component (−B) and a value of approximately 90° is assigned to red (+R), if the user drags a pointer or a finger a short distance from point 410 to point 415 (e.g., 0.2, at approximately a 70° angle), the resulting exemplary parameter can be computed as, for example, 0.1, 0.0, −0.1, which can result in an equal bias in red and yellow, since the angle is equidistant between the two.

As shown in FIG. 4B, if a value of approximately 270° is assigned to cyan (−R) and a value of approximately 310° is assigned to green (+G), if the user drags a pointer or a finger a greater distance from point 420 to point 425 (e.g., 1.0) towards cyan/green at an angle of approximately 280°, the resulting parameter can be computed as, for example, −0.75, 0.25, 0.0. The bias towards −0.75 cyan and 0.25 green can be reflected by the chosen angle which can be ¾ closer to cyan than green.

As shown in FIG. 4C, if the user drags a pointer or a finger down approximately 180° in a second gesture from point 430 to point 435, a shorter distance (e.g., 0.1) towards black (−RGB), the cyan/green parameter can be uniformly darkened to, for example, −0.85, 0.15, −0.1.

Using the input from the exemplary system, method and computer-accessible medium, the application's visual media processing procedure can determine how the RGB parameter is used to change the selected media.

Exemplary Visual Media

Visual media can include any data objects that can be represented visually by a computer on a display (e.g., digital images or digital video sequences) although not limited thereto. A user interface can be displayed only after the user interaction starts, and the user interface can stop being displayed when the user interaction ends, facilitating the user to modify the visual media. This can facilitate the application to be unobtrusive, and only be present when the user selects a parameter capable of being manipulated by the exemplary system, method and computer-accessible medium.

FIG. 1 shows a display of an exemplary user interface according to one exemplary embodiment of the exemplary systems, methods and computer-accessible medium of the present disclosure. The user interface can include, for example, a single point displayed at the location of the start point 101. A line or vector 109 linking the start point with the end point can be displayed. The line can optionally be colored according to the color hue or brightness angle that is selected. A color indicator 102 can illustrate to the user the color parameter that has been computed, and color hue and brightness angle indicators 107 can illustrate to the user approximately which angle to move towards in order to select a particular color hue, or to uniformly increase or decrease the value of a chosen color parameter. Linking line 109 linking the start point 101 with the end point 106 can illustrate to the user the angle and distance that the touch or cursor has been moved. The color hue and brightness angle indicators can optionally highlight the angle that is currently selected. Other exemplary user interfaces can be provided having greater or fewer components than those displayed in FIG. 1.

Figure 3:
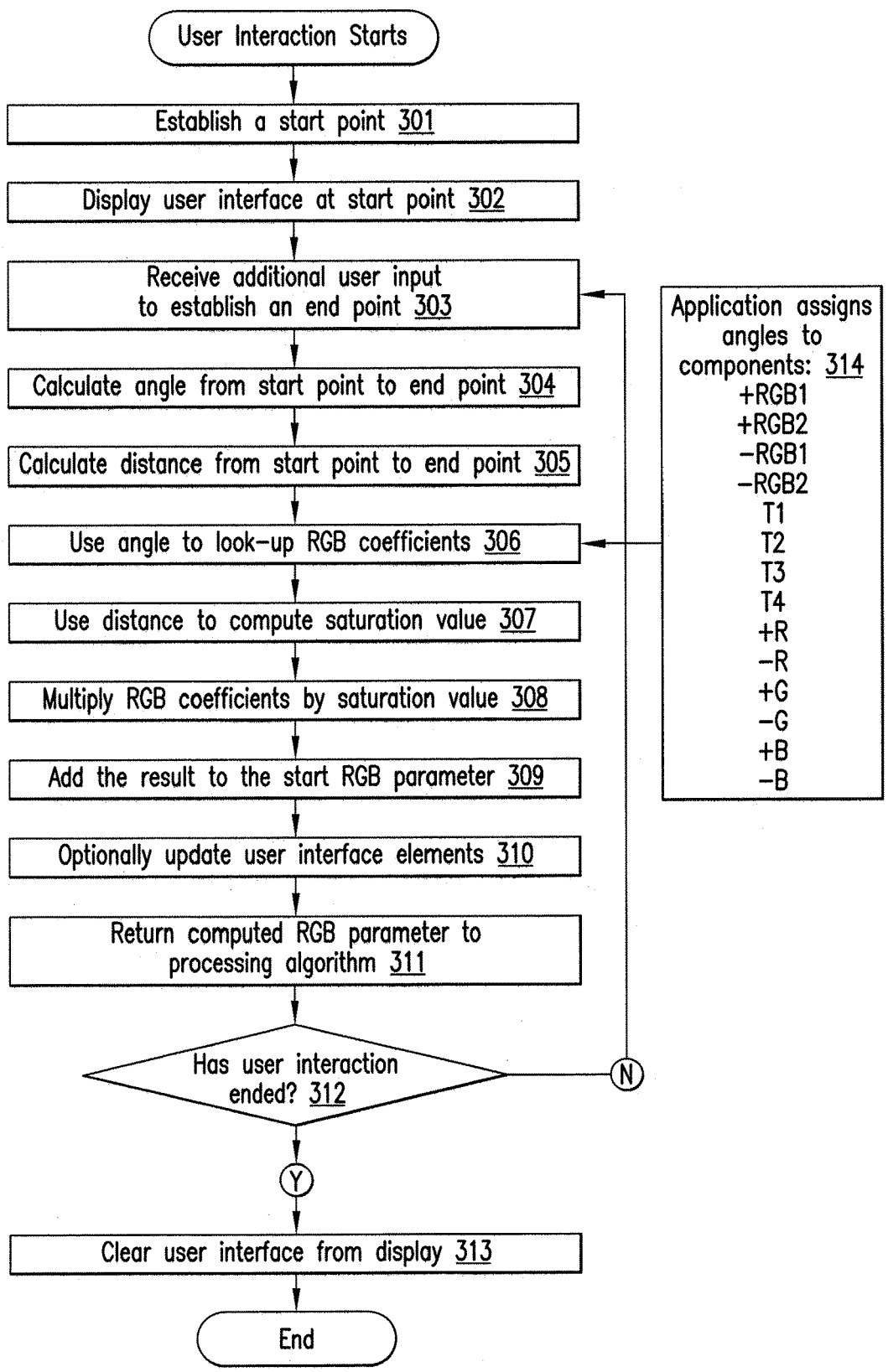
FIG. 3 is an exemplary flow diagram for manipulating an exemplary RGB parameter according to an exemplary embodiment of the present disclosure.

FIG. 3 shows an exemplary flow diagram of an exemplary method for manipulating an exemplary parameter according to an exemplary embodiment of the present disclosure. The RGB parameter(s) can comprise three numerical components representing red, green and blue; although a parameter having a greater number of components can be utilized.

For example, at procedure 301, a start point can be established at the location the gesture starts. The start point may not be recognized if it lies on top of another graphical user interface element. The computed/determined RGB parameter from the last gesture can be used as the start parameter, or a null parameter, (e.g., 0.0, 0.0, 0.0) can be used. At procedure 302, the user interface can be displayed at the start point. At procedure 303, the gesture can be tracked, from which the end point can be derived. At procedure 304, the angle can be calculated from the start point to the end point. The distance can be calculated from the start point to the end point at procedure 305.

A plurality of components (e.g., 14 components) can be assigned angles, and can be used to compute an RGB parameter. Examples of components 314 can include, for example, +RGB1, +RGB2, −RGB1, −RGB2, +R, +G, +B, −R, −G, −B, T1, T2, T3, T4, although not limited thereto. +RGB1 and +RGB2 can uniformly increase the RGB parameter (e.g., element 104 from FIG. 1). −RGB1 and −RGB2 can uniformly decrease the RGB parameter. +R and −R can increase or decrease the red component, adding red or cyan to the RGB parameter (e.g., element 103 from FIG. 1). +G and −G can increase or decrease the green component, adding green or magenta to the RGB parameter. +B and −B can increase or decrease the blue component, adding blue or yellow to the RGB parameter. T1, T2, T3 and T4 can be used to specify the transition angles from a uniform RGB change to a non-uniform, R, G or B component change (e.g., element 105 from FIG. 1). Element 201 (e.g., the Y axis on the exemplary graph of FIG. 2) indicates the saturation coefficient value that can be used for each component. The exemplary nominal range can be +1 to −1. The saturation coefficients can vary with the angle indicated by element 108 in FIG. 1 (e.g., the X axis of the graph). The graph shows how the saturation coefficient weighting of the R,G,B parameters can vary with the angle.

At procedure 306, the value of the calculated angle can be used to look up the two closest components, and the RGB saturation coefficients can be interpolated as a function of the relative difference between the two components. The RGB saturation coefficients can be linearly interpolated from the two closest components.

Figure 2:
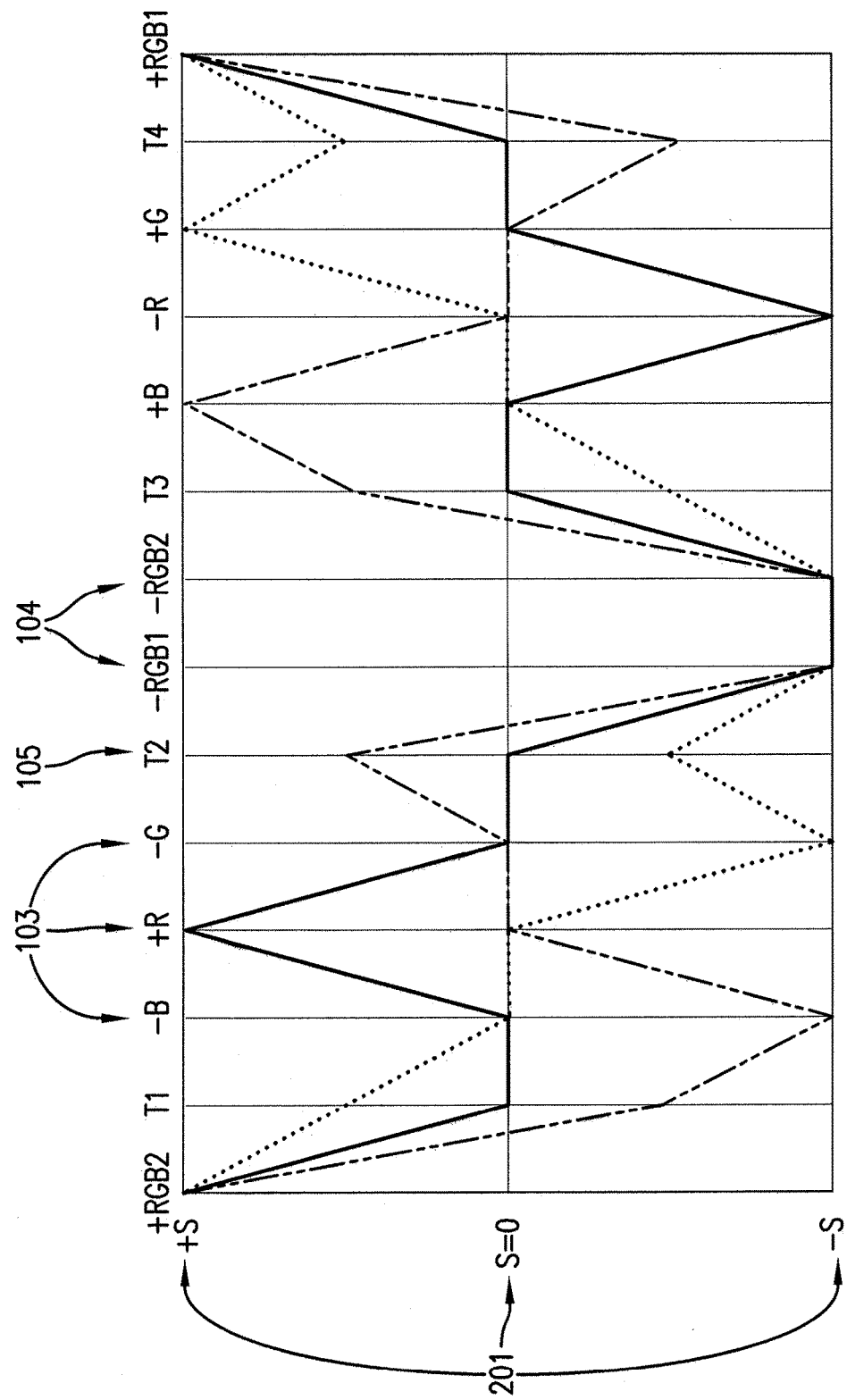
FIG. 2 is an exemplary graph of an exemplary assignment of RGB saturation coefficients according to an exemplary embodiment of the present disclosure.

FIG. 2 depicts an exemplary graph of exemplary interpolations of the RGB saturation coefficients from the component angles assigned in FIG. 1. The relative values of the R, G and B components can change for the angle selected by the user (e.g., element 108 from FIG. 1).

Referring back to FIG. 3, at procedure 307, a saturation value can be calculated as a function of the computed distance. The saturation value can optionally be setup to be clamped at approximately 0.0 for a nominal range. The gesture can move a particular distance from the start point before the computed RGB parameter can be changed. At procedure 308, the saturation value can be multiplied by the RGB saturation coefficients. The exemplary result can be added to the start RGB parameter at procedure 309, and the result can optionally be used to update the color indicator in the graphical user interface at procedure 310.

At procedure 311, the computed RGB parameter can be input into to the application's visual media processing procedure. If the user interaction has ended (e.g., procedure 312), then the user interface can be cleared from the display at procedure 313. If the user interaction has not ended at procedure 312, then the process can continue back at procedure 303 with the updated input of a new end point.

The exemplary system, method and computer-accessible medium can be used in any applications where a user can change at least two numerical component parameters. The parameter can represent red, green and blue components of a color in visual media editing applications. The color can be an input to one of many different types of visual media processing procedures.

Examples of visual media processing procedures that can utilize the RGB parameter(s) as an input can include, for example, lift, gamma and gain color grading functions, American Society of Cinematographers Color Decision List ("ASC CDL"), color correction functions including slope, offset, power parameters, as well as color correction software. The exemplary systems, methods and computer-accessible medium can also be used in arbitrary color balance functions that require numeric RGB inputs, and can be used to change a color in a generic software color picker function, as found in typical office applications. The exemplary angles associated with the components can be preset in each application, or can be tailored by the user. For example, the user can choose a reference angle from which all other components could be uniformly distributed around.

In addition to RGB parameter(s), the exemplary systems, methods and computer-accessible medium, according to an exemplary embodiment of the present disclosure, can be used to manipulate any parameter comprising at least 2 numerical values. For example, the exemplary systems, methods and computer-accessible medium, according to an exemplary embodiment of the present disclosure, can be used on a sound equalizer comprising 8 numerical components, representing frequency bands from treble through to bass, in the same or similar manner as +R, +G, +B, and −R, −G, −B angles described above. +n1 . . . +n8, and −n1 . . . −n8 angles can be assigned to the frequency bands, and then interpolated in the same manner as described above. Similarly, the use of transition angles and global +n1 . . . +n8 angles and −n1 . . . −n8 angles could be used to change all 8 components uniformly. The exemplary systems, methods and computer-accessible medium, according to an exemplary embodiment of the present disclosure, can also be used to manipulate a volume.

Figure 5:
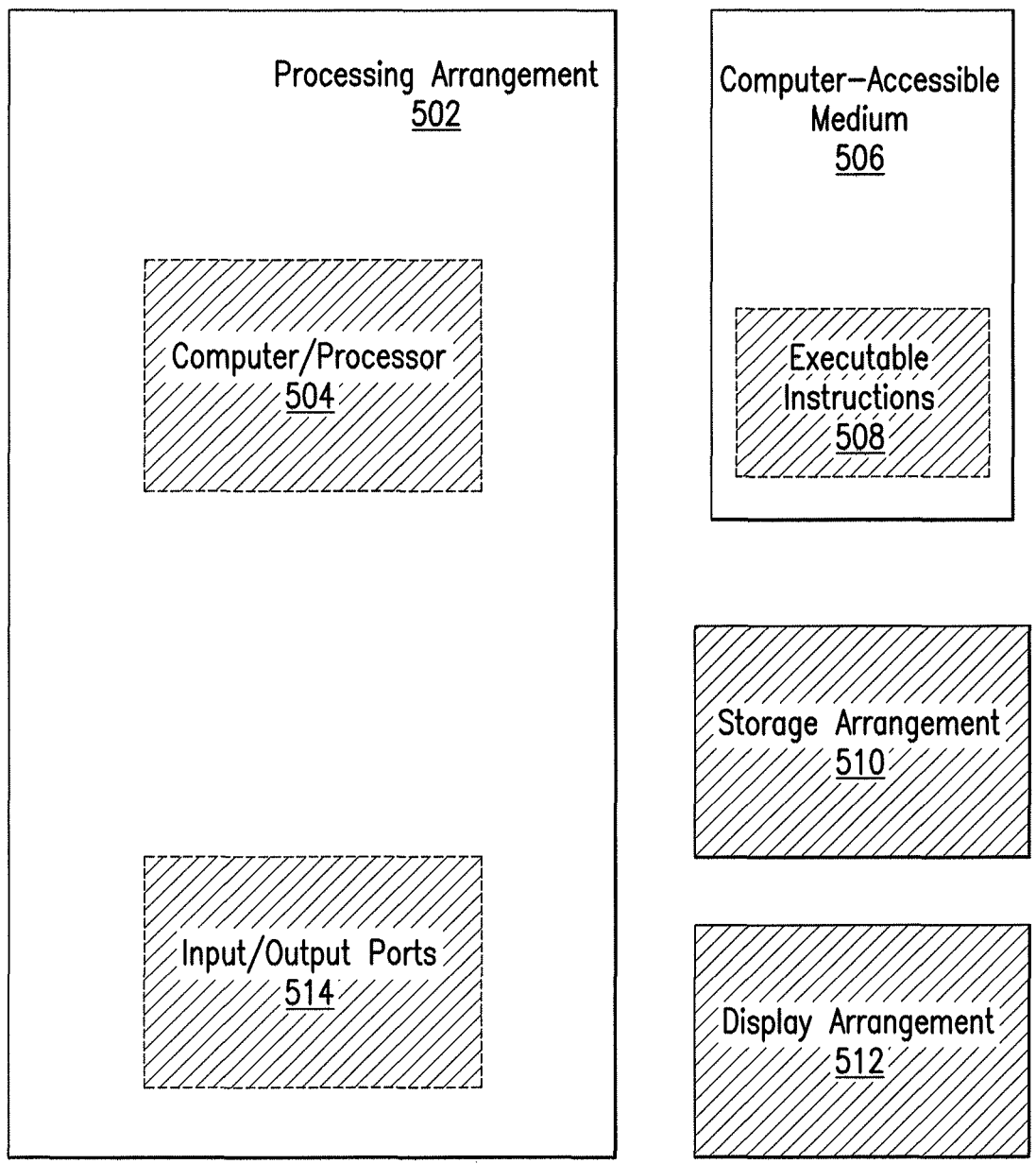
FIG. 5 is an illustration of an exemplary block diagram of an exemplary system in accordance with certain exemplary embodiments of the present disclosure.

FIG. 5 shows a block diagram of an exemplary embodiment of a system according to the present disclosure. For example, exemplary procedures in accordance with the present disclosure described herein can be performed by a processing arrangement and/or a computing arrangement 502. Such processing/computing arrangement 502 can be, for example, entirely or a part of, or include, but not limited to, a computer/processor 504 that can include, for example, one or more microprocessors, and use instructions stored on a computer-accessible medium (e.g., RAM, ROM, hard drive, or other storage device).

As shown in FIG. 5, for example, a computer-accessible medium 506 (e.g., as described herein above, a storage device such as a hard disk, floppy disk, memory stick, CD-ROM, RAM, ROM, etc., or a collection thereof) can be provided (e.g., in communication with the processing arrangement 502). The computer-accessible medium 506 can contain executable instructions 508 thereon. In addition or alternatively, a storage arrangement 510 can be provided separately from the computer-accessible medium 506, which can provide the instructions to the processing arrangement 502 so as to configure the processing arrangement to execute certain exemplary procedures, processes and methods, as described herein above, for example.

Further, the exemplary processing arrangement 502 can be provided with or include an input/output arrangement 514, which can include, for example, a wired network, a wireless network, the internet, an intranet, a data collection probe, a sensor, etc. As shown in FIG. 5, the exemplary processing arrangement 502 can be in communication with an exemplary display arrangement 512, which, according to certain exemplary embodiments of the present disclosure, can be a touch-screen configured for inputting information to the processing arrangement in addition to outputting information from the processing arrangement, for example. Further, the exemplary display 512 and/or a storage arrangement 510 can be used to display and/or store data in a user-accessible format and/or user-readable format.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. In addition, all publications and references referred to above can be incorporated herein by reference in their entireties. It should be understood that the exemplary procedures described herein can be stored on any computer accessible medium, including a hard drive, RAM, ROM, removable disks, CD-ROM, memory sticks, etc., and executed by a processing arrangement and/or computing arrangement which can be and/or include a hardware processors, microprocessor, mini, macro, mainframe, etc., including a plurality and/or combination thereof. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Certain details are set forth of various exemplary embodiments. However, one skilled in the relevant art will recognize that embodiments may be practiced without one or more of these details, or with other methods, components, materials, etc. In other instances, well-known structures associated with controllers, data storage devices and display devices, have not been shown or described in detail to avoid unnecessarily obscuring descriptions of the embodiments.

Unless the context requires otherwise, throughout the specification, the word "comprise" and variations thereof, such as, "comprises" and "comprising" can be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed is:

1. A non-transitory computer-accessible medium having stored thereon computer-executable instructions for performing a procedure to modify a visual media, wherein, when executed by a computer arrangement, the computer arrangement is configured to execute procedures comprising:
   displaying the visual media using a visual media editing application,
   the visual media editing application defining at least one color parameter, wherein the at least one color parameter has three coefficients;
   receiving, at the user interface, a single user input having a start point and an end point;
   upon detecting the single user input, determining a distance between the start point and the end point and determining an angle formed by (i) at least one of a line or a vector based on the start point and the end point, and (ii) at least one of an X-axis or a Y-axis;
   modifying the at least one color parameter according to the determined distance and determined angle, wherein:
      if the determined angle is one of a first specified plurality of angles, uniformly increasing or decreasing all coefficients of the at least one color parameter by a first magnitude, wherein the first magnitude is determined according to the determined distance;
      if the determined angle is one of a second specified plurality of angles different from any one of the first specified plurality of angles, increasing or decreasing at least one coefficient of the at least one color parameter by a second magnitude, wherein the at least one coefficient is determined according to the angle and the second magnitude is determined according to the distance; and
   dynamically modifying the visual media at the user interface according to the modified at least one color parameter.

2. The non-transitory computer-accessible medium of claim 1, wherein the at least one of a line or vector created between the at least two points is displayed by the visual media application.

3. The non-transitory computer-accessible medium of claim 2, wherein the at least one of a color or an intensity of the line or vector is changed based on the modification of the at least one coefficient.

4. The non-transitory computer-accessible medium of claim 1, wherein the single user input is generated by a user making a gesture.

5. The non-transitory computer-accessible medium of claim 4, wherein the gesture is a movement of a finger of a user contacting a screen.

6. The non-transitory computer-accessible medium of claim 4, wherein the gesture is a movement of at least one body part of a user detected by an imaging apparatus.

7. The non-transitory computer-accessible medium of claim 1, wherein the input is generated by at least one of a mouse, stylus or track pad.

8. The non-transitory computer-accessible medium of claim 1, wherein the at least one color parameter is a Red/Green/Blue color parameter.

9. The non-transitory computer-accessible medium of claim 1, wherein the at least one color parameter is input into an application.

10. The non-transitory computer-accessible medium of claim 1, wherein the initial value of the at least one color parameter is 0.

11. The non-transitory computer-accessible medium of claim 1, wherein the initial value of the at least one color parameter is not 0.

12. The non-transitory computer-accessible medium of claim 1, wherein each of a plurality of angles may be assigned to a specific combination of coefficients.

13. A system for modifying a visual media comprising:
   a computer hardware arrangement configured to:
   display the visual media using a visual media editing application,
   the visual media editing application defining at least one color parameter, wherein the at least one color parameter has three coefficients;
   receive, at the user interface, a single user input having a start point and an end point;
   upon detecting the single user input, determine a distance between the start point and the end point and determining an angle formed by (i) at least one of a line or a vector based on the start point and the end point, and (ii) at least one of an X-axis or a Y-axis;
   modify the at least one color parameter according to the determined distance and determined angle, wherein:
      if the determined angle is one of a first specified plurality of angles, uniformly increasing or decreasing all coefficients of the at least one color parameter by a first magnitude, wherein the first magnitude is determined according to the determined distance;
      if the determined angle is one of a second specified plurality of angles different from any one of the first specified plurality of angles, increasing or decreasing at least one coefficient of the at least one color parameter by a second magnitude, wherein the at least one coefficient is determined according to the angle and the second magnitude is determined according to the distance; and
   dynamically modify the visual media at the user interface according to the modified at least one color parameter.

14. The system of claim 13, wherein the computer hardware arrangement is configured to display the at least one of a line or vector created between the at least two points in the visual media application.

15. The system of claim 14, wherein the computer hardware arrangement is further configured to change at least one of a color or an intensity of the line or vector based on the modification of the at least one coefficient.

16. The system of claim 13, wherein the single user input is generated by a user making a gesture.

17. The system of claim 13, wherein the at least one color parameter is a Red/Green/Blue color parameter.

18. A method for modifying a visual media comprising:
   a computer hardware arrangement configured to:
   displaying the visual media using a visual media editing application,
   the visual media editing application defining at least one color parameter, wherein the at least one color parameter has three coefficients;
   receiving, at the user interface, a single user input having a start point and an end point;
   upon detecting the single user input, determine a distance between the start point and the end point and determining an angle formed by (i) at least one of a line or a vector based on the start point and the end point, and (ii) at least one of an X-axis or a Y-axis;
   modifying the at least one color parameter according to the determined distance and determined angle, wherein:

if the determined angle is one of a first specified plurality of angles, uniformly increasing or decreasing all coefficients of the at least one color parameter by a first magnitude, wherein the first magnitude is determined according to the determined distance;

if the determined angle is one of a second specified plurality of angles different from any one of the first specified plurality of angles, increasing or decreasing at least one coefficient of the at least one color parameter by a second magnitude, wherein the at least one coefficient is determined according to the angle and the second magnitude is determined according to the distance; and dynamically modifying the visual media at the user interface according to the modified at least one color parameter.

* * * * *